United States Patent Office 3,706,715
Patented Dec. 19, 1972

3,706,715
CROSS-LINKABLE POLYMER COMPOSITIONS COMPRISING ETHYLENICALLY UNSATURATED POLYMER
Karl Brack, Wilmington, Del., assignor to Hercules Incorporated, Wilmington, Del.
No Drawing. Filed July 1, 1971, Ser. No. 158,981
Int. Cl. C08f 11/00; C08g 41/04
U.S. Cl. 260—77.5 AC                 4 Claims

ABSTRACT OF THE DISCLOSURE

Cross-linkable ethylenically unsaturated polymer compositions are described, which compositions comprise an ethylenically unsaturated polymer, a precursor of a polyfunctional nitrile N-oxide or nitrile imine and a lactone or sultone. These compositions cross-link when heated. Suitable lactones are those containing 3 or 4 carbon atoms in the lactone ring such as propiolactones and butyrolactones and suitable sultones are those containing 3 carbon atoms in the sultone ring such as 1,3-propane sultone. These compositions are useful as sealants and adhesives.

---

This invention relates to cross-linkable polymer compositions useful in sealants, adhesives, coatings, molding, casting, etc., and to a process of cross-linking said compositions. More particularly, this invention relates to crosslinkable ethylenically unsaturated polymer compositions which cross-link on initiation with heat.

It is known that ethylenically unsaturated polymers can be cross-linked by means of 1,3-dipolar compounds such as polyfunctional nitrile N-oxides or nitrile imines. To utilize such a cross-linking process in, for example, a sealant composition, a precursor of the polyfunctional nitrile N-oxide or imine is used in combination with a latent base or other material that will function to produce the nitrile N-oxide or imine at the desired specific time, i.e., when the sealing or coating composition is applied.

Now in accordance with this invention it has been found that compositions can be prepared which, when heated, will cross-link to solid, insoluble products. Since the composition can be prepared without using any solvents, there is little or no shrinkage upon curing. Typical compositions of this invention contain an unsaturated polymer, a precursor of a polyfunctional nitrile N-oxide or nitrile imine compound and a lactone containing three or four carbon atoms in the lactone ring or a sultone containing three carbon atoms in the sultone ring.

Any unsaturated polymer, containing ethylenic unsaturation where there is at least one hydrogen radical attached to at least one of the carbon atoms of the ethylenic double bond can be used in the compositions of this invention. Where fluid compositions are desired, unsaturated polymers having a molecular weight range of from about 1,000 to about 20,000 are preferred. However, higher molecular weight polymers can be used in conjunction with small amounts of solvents and/or plasticizers to obtain the desired fluidity. Typical unsaturated polymers that can be used are polybutadiene-1,2, polybutadiene-1,4, styrene-butadiene copolymers, isobutylene-isoprene copolymers, natural rubber, polyester resins, such as maleate- and fumarate-containing polyesters and unsaturated acrylate copolyesters, butadieneacrylonitrile copolymers, ethylene-propylene-dicyclopentadiene terpolymers, polychloroprene, polyisoprene, unsaturated polyurethanes, unsaturated alkyd resins such as tall oil alkyd resins, polyether copolymers and terpolymers containing at least two unsaturated epoxide constituents such as propylene oxide-allyl glycidyl ether copolymers and ethylene oxide-epichlorohydrin-allyl glycidyl ether terpolymers, etc., and blends of these polymers with each other. In addition to the olefinically unsaturated polymers, polymers containing acetylenic unsaturation can be used. In some cases it may be desirable to use partially hydrogenated products of the above unsaturated polymers.

Any precursor of a polyfunctional nitrile N-oxide or nitrile imine compound having the formula selected from the group consisting of

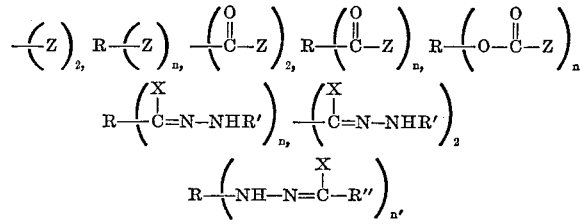

where Z is

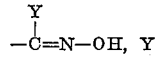

is $-NO_2$ or a halide radical, i.e., fluorine, chlorine, bromine or iodine, R is an organic radical having a valence greater than 1, generally 2–10, R′ is selected from the group consisting of the hydrogen and monovalent hydrocarbon radicals, R″ is a monovalent hydrocarbon radical, X is a halide radical and $n$ is an integer equal to the valence of R.

Generally, R will be selected from the group consisting of the hydrocarbon, halide substituted hydrocarbon, hydrocarbonoxy-hydrocarbon, hydrocarbon-thiohydrocarbon and hydrocarbon-sulfonyl-hydrocarbon polyvalent radicals. In preferred embodiments of this invention R is a divalent hydrocarbon radical selected from the group consisting of alkylene radicals such as, for example, ethylene, trimethylene, tetramethylene, pentamethylene, hexamethylene, octamethylene, decamethylene, dodecamethylene, octadecamethylene, and the like; arylene radicals such as o-, m-, p-phenylene, halogenated o-, m-, p-phenylene, biphenylene, naphthylene, and the like; cycloalkylene radicals such as cyclohexylene, cyclopentylene, cyclooctylene, cyclobutylene, and the like; arylenedialkylene radicals such as o-, m-, p-xylylene, o-, m-, p-phenylene diethylene and the like; alkylene-diarylene radicals such as methylene bis(o-, m-, p-phenylene), ethylene bis(o-, m-, p-phenylene), and the like; cycloalkylene-dialkylene radicals such as 1,2-, 1,3- and 1,4-cyclohexane dimethylene, 1,2- and 1,3-cyclopentane dimethylene and the like; alkylene oxy alkylene radicals such as ethylene oxy ethylene, and the like; arylene oxy arylene radicals such as phenylene oxy phenylene, and the like; alkarylene oxy alkarylene radicals such as methylene phenylene oxy methylene phenylene, and the like, and the corresponding thio and sulfonyl radicals such as ethylene thio ethylene, phenylene thio phenylene, phenylene methylene thio methylene phenylene, and butylene sulfonyl butylene, and the like.

Generally, the monovalent hydrocarbon radicals in the group from which R′ and R″ are selected encompass alkyl radicals preferably containing 1–20 carbon atoms such as, for example, methyl, butyl, nonyl, decyl, pentadecyl, and the like; cycloalkyl radicals such as cyclopentyl, cyclohexyl, cyclooctyl, cyclododecyl, and the like; aryl radicals preferably having 1–3 rings such as phenyl, biphenyl, naphthyl, and the like; alkaryl radicals preferably having 1 or more alkyl groups containing 1–20 carbon atoms and 1–3 rings in the aryl group such as, for example, tolyl, octadecylnaphthyl, and the like; and similar aralkyl radicals, such as benzyl, naphthylhexamethylene, and the like.

Exemplary of the precursors of polyfunctional nitrile N-oxides and nitrile imines used in this invention are the polyfunctional hydrazide halides such as, for instance, isophthaloyl-bis(phenylhydrazide chloride),
terephthaloyl-bis(phenylhydrazide chloride),
isophthaloyl-bis(methylhydrazide chloride),
isophthaloyl-bis(ethylhydrazide fluoride),
terephthaloyl-bis(methylhydrazide chloride),
terephthaloyl-bis(ethylhydrazide bromide),
succinoyl-bis(phenylhydrazide chloride),
adipoyl-bis(methylhydrazide) chloride),
p-phenylene dipropionyl-bis(methylhydrazide chloride),
tetramethylene dibenzoyl-bis(butylhydrazide iodide),
N,N'-p-phenylene-bis(benzoyl hydrazide chloride),
N,N'-m-phenylene-bis(benzoyl hydrazide chloride),
glutaryl-bis(phenylhydrazide chloride),
1,4-cyclohexanedicarbonyl-bis(phenylhydrazide chloride),
trimesoyl-tris(phenylhydrazide chloride),
trimesoyl-tris(methylhydrazide chloride),
trimesoyl-tris(ethylhydrazide chloride),
trimellitoyl-tris(phenylhydrazide chloride),
trimellitoyl-tris(methylhydrazide chloride),
pyromellitoyl-tetrakis(butylhydrazide chloride),
benzene pentacarbonyl-pentakis(phenylhydrazide chloride), and the like; the poly(hydroximoyl halides), polyfunctional carbonylhydroximoyl halides, and polyfunctional nitrolic acids such as 2,3-dioxosuccino-bis(hydroximoyl chloride),
methylene-bis(glyoxylohydroximoyl chloride),
ethylene-bis(glyoxylohydroximoyl chloride),
tetramethylene-bis(glyoxylohydroximoyl fluoride),
pentamethylene-bis(glyoxylohydroximoyl chloride),
1,2,3-propane-tris(glyoxylohydroximoyl chloride),
1,2,4-pentane-tris(glyoxylohydroximoyl chloride),
1,4-cyclohexane-bis(glyoxylohydroximoyl chloride),
p-phenylene-bis(acetohydroximoyl chloride),
2,2'-thia-bis(acetohydroximoyl chloride),
3,3'-thia-bis(propionohydroximoyl chloride),
isophthalo-bis(hydroximoyl chloride),
terephthalo-bis(hydroximoyl chloride),
4,4'-bis(benzohydroximoyl chloride),
4,4'-methylene-bis(benzohydroximoyl chloride),
4,4'-oxa-bis(benzohydroximoyl chloride),
3,3'-thia-bis(benzohydroximoyl chloride),
p-phenylene-bis(glyoxylohydroximoyl chloride),
4,4'-bis(phenylglyoxylohydroximoyl chloride),
4,4'-methylene-bis(phenylglyoxylohydroximoyl chloride), the ethylene glycol, tetramethylene glycol, 1,4-cyclohexylene glycol, resorcinol, etc., esters of chloroximinoglyoxylic acid, etc., 4,4'-methylene-bis(phenylglyoxylonitrolic acid), m-phenylene-bis(glyoxylonitrolic acid), 4,4'-bis(phenylglyoxylonitrolic acid), etc.

The above-described precursors are converted to nitrile N-oxides or nitrile imines by the action of the lactone or sultone. It is believed that these lactones and sultones act by abstracting hydrogen halide from the precursor converting it to either a nitrile N-oxide or nitrile imine. The resulting nitrile N-oxide or nitrile imine in turn is believed to react with the double bonds of the polymer by way of 1,3-dipolar addition.

The lactones that are useful, in accordance with this invention, are lactones containing three and four carbon atoms in the lactone ring as, for example, propiolactone, beta-butyrolactone, gamma-butyrolactone, alpha-phenylpropiolactone, beta-phenyl-propiolactone, alpha,beta-diphenyl-propiolactone, beta,beta-diphenyl-propiolactone, beta-cyclohexyl-propiolactone, etc.

The sultones that are useful, in accordance with this invention, are those containing three carbon atoms in the sultone ring as, for example, 1,3-propane sultone, 1-phenyl-1,3-propane sultone, 2-phenyl-1,3-propane sultone, 3-phenyl-1,3-propane sultone, 1-cyclohexyl-1,3-propane sultone, 2-cyclohexyl-1,3-propane sultone, 3-cyclohexyl-1,3-propane sultone, etc.

Varied amounts of the three basic ingredients can be employed in preparing the cross-linkable compositions of this invention, depending upon the degree of cross-linking desired, the nature of the unsaturated polymer, etc. In general, the amount of nitrile N-oxide or nitrile imine precursor employed (based on the weight of the polymer) will be from about 0.1% to about 30%, preferably from about 1% to about 10%. The lactone or sultone will be present in amounts sufficient to convert the precursor to the corresponding nitrile N-oxide or nitrile imine, preferably in an excess of from about 1% to about 30% over that required to convert the precursor.

The cross-linkable compositions of this invention can be prepared by blending or admixing the ingredients in any desired fashion. For example, the unsaturated polymer and precursor can be dissolved in an anhydrous volatile solvent therefor and then admixed with the lactone or sultone plus any other materials. After mixing, the solvent can be removed under reduced pressure.

It may be desirable in certain cases to modify the compositions by partially reacting the precursor with the polymer. For example, a bis(carbohydroximoyl chloride) can be treated with sufficient of the lactone or sultone to only convert approximately half of the hydroximoyl chloride groups to nitrile N-oxide groups. When this treatment is conducted in the presence of the unsaturated polymer, the nitrile N-oxide groups will add onto the polymer at its double bonds, producing an unsaturated polymer substituted with carbohydroximoyl chloride substituents. Additional lactone or sultone can be added to the carbohydroximoyl chloride substituted polymer. The resulting composition is stable until heated, at which time the hydroximoyl chloride groups convert to nitrile N-oxide groups which cross-link the polymer.

In addition to the three basic ingredients, other additives can be incorporated. Typical additives are fillers such as carbon black, titanium dioxide, silica, diatomaceous earth, talc, etc.; plasticizers such as phthalates, adipates, sebacates, fatty acid esters of pentaerythritol, fatty acid esters of dipentaerythritol, etc.; stabilizers; adhesive promoters, pigments; and so forth. Obviously there are many cases in which other additives are not required or desired, and excellent results are achieved when only the basic ingredients are employed.

As indicated above, cross-linking is initiated by heating the above-described composition. The specific conditions required for cross-linking depend upon the lactone or sultone utilized. In general, the compositions will be cross-linked by heating at a temperature from about 90° C. to about 180° C. for a period of from about 0.5 minute to about 120 minutes. The compositions are relatively stable and can be stored at room temperature for months with little or no detectable cross-linking.

The compositions of this invention are useful in numerous applications. For example, they can be used as one component sealants such as caulking compositions which are fluid enough to extrude into a joint from a caulking gun but will not flow once placed in the joint and which cross-link on heating. Another use is as an adhesive. Compositions of this invention are excellent adhesives for bonding glass, metal, wood, plastics, fibers, fabrics, etc. Another use is in coating compositions. Still another use is in rubber casting or molding. Further uses will be apparent to those skilled in the arts.

The following examples will further illustrate the compositions of this invention. All parts and percentages are by weight unless noted otherwise.

EXAMPLE 1

A mixture of 23.7 parts of a linear, ethylenically di-unsaturated urethane copolymer having a molecular weight of about 15,000, 2.74 parts of a branched, ethylenically triunsaturated urethane copolymer having a molecular weight of about 5000, 1.0 part of bis(phenylglyoxylohydroximoyl chloride), 2.3 parts of a thixotropic agent and 0.3 part of an antioxidant was mixed in a dough mixer with 0.637 part of gamma-butyrolactone under nitrogen for 30 minutes. A smooth, brown paste was obtained.

The paste was storable at room temperature under exclusion of moisture for weeks without a change in viscosity.

A sample of the paste was heated to 140° C. for 30 minutes. During this time it turned into a tough rubber that was not soluble in tetrahydrofuran, showing that the polymer mixture was cross-linked.

EXAMPLE 2

Thirty (30.0) parts of the same polyurethane mixture used in Example 1 was mixed with 0.496 part of propiolactone in a dough mixer under nitrogen. The smooth paste so obtained was storable at room temperature under exclusion of moisture for weeks without a change in viscosity.

A sample of the paste was heated to 120° C. for 30 minutes. During this time the paste turned into a tough rubber which was insoluble in tetrahydrofuran.

EXAMPLE 3

Twenty-nine (29.0) parts of the same polyurethane mixture used in Example 1 was mixed with 0.7 part of finely ground 1,3-propane sultone. The mixture was then milled under nitrogen in a dough mixer for one hour. The smooth paste so obtained was storable at room temperature in the absence of moisture for weeks without any change in viscosity.

A sample of this paste was heated to 140° C. for 30 minutes. During this time it cross-linked to a tough rubber, which was insoluble in tetrahydrofuran.

What I claim and desire to protect by Letters Patent is:

1. A cross-linkable polymer composition comprising (1) an ethylenically unsaturated polymer having at least one hydrogen radical attached to at least one of the carbon atoms of the ethylenic double bond, (2) a precursor of a polyfunctional nitrile N-oxide or nitrile imine having the formula selected from the group consisting of $(Z)_2$, $R(Z)_n$

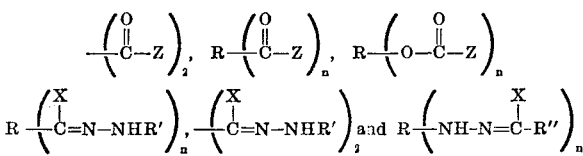

where z is

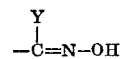

Y is $-NO_2$ or a halide radical, R is an organic radical having a valence from 2 to 10, R' is a hydrogen or monovalent hydrocarbon radical, R" is a monovalent hydrocarbon radical, X is a halide radical and $n$ is an integer equal to the valence of R, and (3) one of the group selected from lactones containing 3 or 4 carbon atoms in the lactone ring and sultones containing 3 carbon atoms in the sultone ring.

2. The composition of claim 1 wherein (3) is propiolactone.

3. The composition of claim 1 wherein (3) is gamma-butyrolactone.

4. The composition of claim 1 wherein (3) is 1,3-propane sultone.

References Cited

UNITED STATES PATENTS

| | | | |
|---|---|---|---|
| 3,454,506 | 7/1969 | Brack | 260—2.5 |
| 3,503,906 | 3/1970 | Brack | 260—2.5 |
| 3,576,908 | 4/1971 | Brack | 260—858 |
| 3,592,784 | 7/1971 | Brack | 260—2.5 |
| 3,627,715 | 12/1971 | Brack | 260—22 |

DONALD E. CZAJA, Primary Examiner

R. W. GRIFFIN, Assistant Examiner

U.S. Cl. X.R.

117—122 PA, 161 R, 161 KP; 156—327, 332, 338; 260—22 CA, 75 UA, 75 S, 77.5 R, 80.7, 82.7, 83.1, 85.3 C, 739